(12) United States Patent
Guidi et al.

(10) Patent No.: US 8,533,024 B2
(45) Date of Patent: Sep. 10, 2013

(54) SYSTEM AND METHOD FOR MANAGING USERS OF A GYM FACILITY

(75) Inventors: Jarno Guidi, Forli Cesena (IT); Francesco Arlotti, Forli Cesena (IT)

(73) Assignee: Technogym S.p.A., Gambettola (FC) (IT)

( * ) Notice: Subject to any disclaimer, the term of this patent is extended or adjusted under 35 U.S.C. 154(b) by 184 days.

(21) Appl. No.: 12/876,466

(22) Filed: Sep. 7, 2010

(65) Prior Publication Data

US 2011/0060620 A1    Mar. 10, 2011

Related U.S. Application Data

(63) Continuation of application No. PCT/IT2009/000400, filed on Sep. 7, 2009.

(51) Int. Cl.
*G06Q 10/00* (2012.01)
*A63B 71/00* (2006.01)

(52) U.S. Cl.
USPC .............................. 705/7.25; 482/8

(58) Field of Classification Search
USPC ............................... 705/7.25; 482/8
See application file for complete search history.

(56) References Cited

U.S. PATENT DOCUMENTS

| | | | | |
|---|---|---|---|---|
| 6,503,173 | B2 * | 1/2003 | Clem | 482/8 |
| 7,641,592 | B2 * | 1/2010 | Roche | 482/9 |
| 7,771,320 | B2 * | 8/2010 | Riley et al. | 482/9 |
| 8,066,514 | B2 * | 11/2011 | Clarke | 434/247 |
| 2004/0229729 | A1 * | 11/2004 | Albert et al. | 482/8 |
| 2004/0241629 | A1 * | 12/2004 | Ondrusz et al. | 434/247 |
| 2007/0087913 | A1 * | 4/2007 | Jaquish et al. | 482/91 |
| 2007/0219059 | A1 * | 9/2007 | Schwartz et al. | 482/8 |

OTHER PUBLICATIONS

Dallas Hudgens. (Nov. 12, 1999). In Motion; Logging on to Work Out :[Final Edition]. The Washington Post,p. WW, 75:1. Retrieved Jun. 11, 2012, from ProQuest Newsstand. (Document ID: 46313931).*
Sandra Jill Pennecke, Correspondent. (Mar. 19, 2000). Woman Excels as an Instructor Despite Her Medical Condition :[Kempsville Edition]. Virginian—Pilot,p. 14. Retrieved Jun. 11, 2012, from ProQuest Newsstand. (Document ID: 51995683).*
Weimo Zhu. (1997). Making bootstrap statistical inferences: A tutorial. Research Quarterly for Exercise and Sport, 68(1), 44-55. Retrieved Jun. 11, 2012, from Research Library. (Document ID: 11394168).*

* cited by examiner

*Primary Examiner* — Jonathan G Sterrett
*Assistant Examiner* — Folashade Anderson
(74) *Attorney, Agent, or Firm* — Sughrue Mion, PLLC (57) ABSTRACT

The present invention relates to a method for managing users of a gym facility. The method comprises the steps of: analyzing a population of users or possible users of a gym facility by means of statistical tools in order to detect desires of attaining mean term objectives, or "ASPIRATIONS", of the population being analyzed; determining, by means of statistical tools, a limited number of ASPIRATIONS present in the population being analyzed; subdividing the population being analyzed, by means of statistical tools, into homogeneous groups each belonging to a given ASPIRATION included in a limited number of ASPIRATIONS; and assigning a user to at least one of the homogeneous groups based on responses to a closed-response questionnaire. The invention also relates to a system for managing users of a gym facility and to an information technology product for managing a gym facility and the users of a gym facility.

6 Claims, 6 Drawing Sheets

SYSTEM AND METHOD FOR MANAGING USERS OF A GYM FACILITY

CROSS REFERENCE TO RELATED APPLICATIONS

This application is a Continuation of PCT/IT2009/000400 filed Sep. 7, 2009, the contents of which are incorporated herein by reference in their entirety.

TECHNICAL FIELD

The present invention generally relates to a system and a method for managing users of a gym facility.

In the present description, the terms "gym facility" and "gym" are used and are to be intended as including any place or space where a physical activity is performed or training services are provided, such as spaces in hotels, companies, schools, hospitals, houses, etc.

More particularly the present invention relates to a method of associating training programs with users of a gym facility, to the corresponding method of managing both the gym facility, intended as a system including spaces and tools, and the gym users, and to the system implementing the method.

PRIOR ART

It is known that, within a gym or a gym system, the different users are assigned a respective training program that generally comprises one or more training sessions each week, which include sets of exercises with or without use of tools, to be performed when attending the gym.

It is also known that the different exercises included in the training sessions are classified as training components, which, as it is generally known from scientific publications in the field (U.S. Department of Health and Human Services: "Physical Activity Guidelines Advisory Committee Report, 2008", or Thomas R. Baechle, Roger W. Earle: "Essentials of strength training and conditioning", NSCA, 2ed. Human Kinetics, 2000, etc.), which are referred to, include:
cardio component (cardio), which is arranged to improve the capability of the circulatory and respiratory system to supply oxygen during the physical activity;
strength component (strength), which is arranged to improve the capability of a set of muscles to make efforts;
flexibility component (flexibility), which is arranged to improve the range of movement of a joint;
coordination component (coordination), which is arranged to improve the coordinate use of parts of the body;
speed component (speed), which is arranged to improve the capability to perform movements in quick manner.

According to the prior art, it is general practice that the gyms, intended as structures, are subdivided into sections or areas corresponding to the training components and that such areas include tools also substantially corresponding to the training components.

Thus, the prior art generally teaches subdividing the gym structures into cardio, strength, flexibility, coordination and speed areas, each comprising tools prevailingly intended for the execution of the respective training components.

It is also known that the training programs are assigned by the trainers to the users mainly depending on the users' requests, possibly filtered by personal evaluations by the trainer, and that such programs are processed and translated into cards containing instructions for the training sessions by means of software modules residing in electronic computers located in the gym.

In accordance with the prior art, also the training programs processed in this manner are generally made to correspond to the training components and the trainer generally limits himself/herself to assign a heavier or lighter training load depending on the user's characteristics.

In training program management it is also known that the trainers have at disposal software modules residing in electronic computers located in the gym in order to manage the users.

Such prior art modules keep records of the users' attendance at the gym and allow checks and controls about the actual use of the gym by the users.

The gym system as described above is showing a lot of problems.

A first problem is that, since the internal spaces of the gym structure and the tools assigned to such spaces correspond to the training components, such tools cannot be readily used by users who, coming from different training components, only occasionally need to use them.

It is to be pointed out here that some tools can be used for several training components, so that correspondence tables exist where the tools that can be used for several training components are listed.

For instance, a tool defined as being of the "cardio" type as prevailing component, may also be used as a tool of the "speed" type, with different loads: hence, since the tools are located in the gym sections in accordance with the prevailing training components, a possible use for non-prevailing training components entails some inconvenience for the user who must move from one section to another.

A second problem is that, since the training programs defined depending on the users' requests prevailingly correspond to the training components, such programs are in a very limited number, are scarcely flexible, are intended to meet short term requirements by the users and generally are adapted to the training components rather than to actual, but not expressed, mean term requirements of the users.

It is to be pointed out here that using only the explicit users' requests is a criterion that can be misleading in the mean term.

Indeed, should a request be implausible, obviously the training program assigned will be wrong.

If a request is plausible, due to the intrinsic limitation of the training components, the request leads to associating a program comprising a single training component with the user, while other non-expressed components, which anyway could have been useful for the user, are neglected.

A further and more general problem, is that, according to the prior art, the management of the gym system and the assignment of the training programs are performed based upon local experiences that take into account the particular gym facility only, without exploiting more general experiences.

A consequence of the problems discussed above is that the gym system, as conceived by the prior art, proves to be unsuitable to meet the users' requirements. This is demonstrated by the fact the number of gym users is decreasing and that, in the whole of the gym facilities organised according to the prior art, 50% of the users abandon the gym and the training program before completion thereof.

By summarising, the Applicant has realised that the gym system, as managed at present, is not able to assign training programs corresponding to the actual users' requirements, nor it is able to effectively rationalise the management of the gym areas and of the users attending the gym facility.

DESCRIPTION OF THE INVENTION

It is an object of the present invention to overcome the problems discussed above by means of an architecture and a method which are both simple and rational.

The object is achieved by the system for managing users of a gym facility as claimed herein.

The present invention also relates to a method for managing users of a gym facility, as well as to an information technology product that can be loaded into the memory of at least one computer and comprises software code portions for carrying out the above method, when the product is executed on at least one computer. As used herein, the reference to such an information technology product is intended as being equivalent to the reference to a computer-readable medium containing instructions for controlling a computer system or device in order to coordinate the execution of the method according to the invention.

The reference to "at least one computer" is intended to set forth the possibility for the present invention of being implemented in distributed manner on a plurality of computers.

The claims are an integral part of the technical teaching provided herein in respect of the invention.

In accordance with a preferred embodiment, the method of the present invention is configured for analysing a population of users and for determining, by means of statistical tools, wishes of attaining mean term objectives, or "ASPIRATIONS", associated with gym activities.

In accordance with another feature of the present invention, the method provides for associating with each user a histogram representative of the user's ASPIRATIONS and using such histogram as a reference basis for determining the training components to be assigned to the user.

In accordance with a further feature of the present invention, the method provides for using the users' ASPIRATIONS as a basis for both assigning the management of the users to a trainer and subdividing the gym into areas corresponding to the ASPIRATIONS managed in the gym.

In accordance with an even further feature of the present invention, the method provides for obtaining the areas consistent with the aspirations by means of tools and machines corresponding to the ASPIRATIONS so as to allow each user inside the gym to find himself in homogeneous environments allowing the user to consider himself as a part of a group.

BRIEF DESCRIPTION OF THE FIGURES

The above and other features and advantages of the present invention will become apparent from the following description of a preferred embodiment, made only by way of non limiting example with the help of the accompanying drawings, in which elements denoted by a same or similar numerical reference correspond to elements having the same or similar function and construction, and in which.

DESCRIPTION OF A PREFERRED EMBODIMENT

Figure 1:
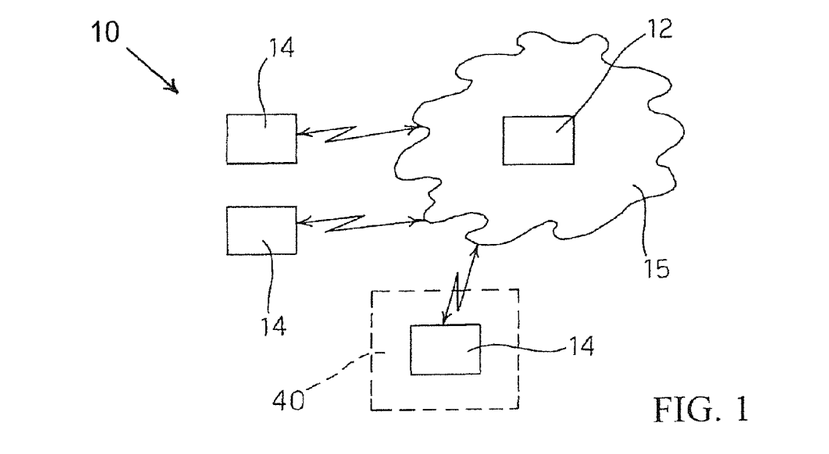
FIG. 1 shows a general diagram of the system according to the invention.

Referring to FIG. 1, a system 10 for managing users of a gym facility 40 comprises, in the preferred embodiment, at least one centralised server 12 and, preferably, a plurality of remote terminals or personal computers (local terminals or PCs) 14 located in respective gym facilities 40 or available to individual users and connectable to server 12 through a network 15, for instance an Internet network.

System 10 includes a plurality of software modules, installed partly on server 12 and partly on terminals 14, the functions of which are described in detail hereinafter in connection with an exemplary embodiment which is considered preferred.

Of course, the example as described can be applied, with the proper modifications, to all places or spaces, here generally defined "gym facility" or "gym", where a physical activity is performed or training services are provided, such as spaces in hotels, companies, schools, hospitals, houses, etc.

The software modules provided for in system 10 can be divided, for sake of description simplicity, into analysis modules 21 (FIG. 2) and process modules 41.

Figure 2:
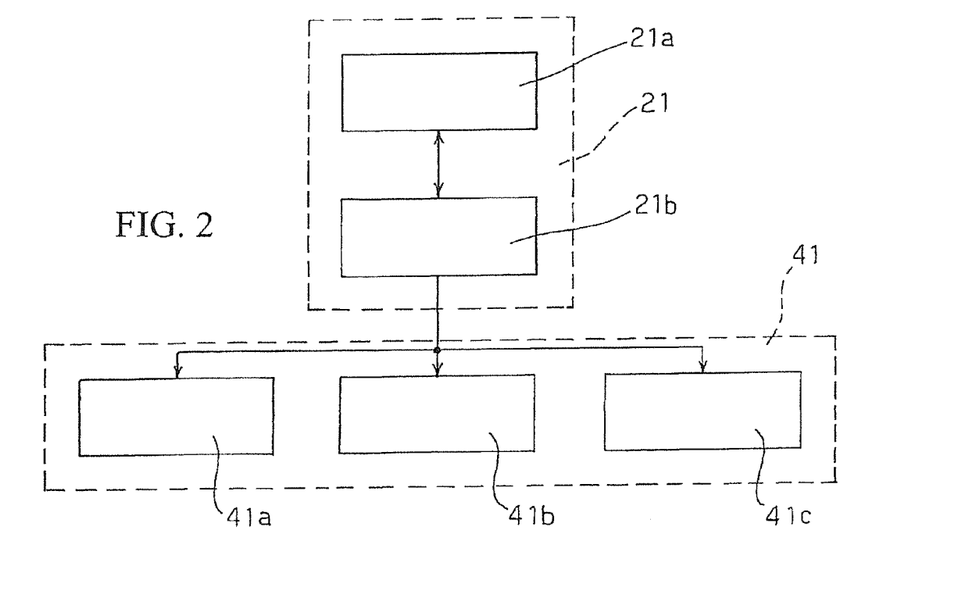
FIG. 2 shows a flow chart of different processes implemented in the system shown in FIG. 1.

According to the present exemplary embodiment, analysis modules 21 are generally intended to detect individual or group characteristics relevant to a population of users or possible users of a gym ("users") and process modules 41 are intended to transform the analysis results into actual results, such as for instance training programs.

In turn, analysis modules 21 can be divided, according to the present exemplary embodiment, into base analysis modules 21a, intended to determine, based upon a statistical analysis applied to numerically significant specimens, characteristics typical of user groups, and personal analysis or personal profiling modules 21b, intended to determine characteristics typical of individual users.

More particularly, system 10 and the method of managing users of a gym facility or a gym system are based on the following basic assumption obtained by using base modules 21a:

the population attending or intending to attend the gyms (users) can be represented as a limited number of groups distinguished according to the "ASPIRATION", where the term "ASPIRATION" can be defined, in accordance with the present exemplary embodiment, as:

deep desire of attaining something, of changing, of being different, which desire motivates to performing physical activity, motion, exercise and sport.

The above assumption entails that an ASPIRATION is typically defined over a mean/long period of years and typically it is not associated with a measurable objective, but with an ideal objective, so that the ASPIRATIONS generally have a meaning substantially complementary to the training components.

Thus, base analysis modules 21a allow detecting, by using statistical analysis tools applied in novel manner to the gym system, a limited number of ASPIRATIONS each representing a group with homogenous characteristics.

In the exemplary embodiment described herein, as a result of experimental analyses performed on users belonging to some European countries, six base ASPIRATIONS, listed hereinbelow, have been recognised:

MOVE ASPIRATION (MOVE): it represents the individual desire of being active and healthy (I practise in order to improve the everyday's wellness);

SHAPE ASPIRATION (SHAPE): it represents the individual desire of appearing fit (I practise in order to burn calories, to keep my weight under control and to keep my body tonic);

POWER ASPIRATION (POWER): it represents the individual desire of having the physical aspect of a powerful person (I practise in order to appear strong and powerful);

SPORT ASPIRATION (SPORT): it represents the individual desire of actively practising sports (I practise in closed and open spaces to improve my sport performance);

BALANCE ASPIRATION (BALANCE): it represents the individual desire of relaxing from a stressful life (I practise in order to find a mental and physical balance);

FUN ASPIRATION (FUN): it represents the individual desire of meeting new people and being confronted with new experiences (I practise in order to make new acquaintances and experiences).

As it can be clearly appreciated from the above examples, the ASPIRATIONS are representative of mean term objectives and hence they provide a profile of a gym user which is much more reliable in time.

Figure 7:
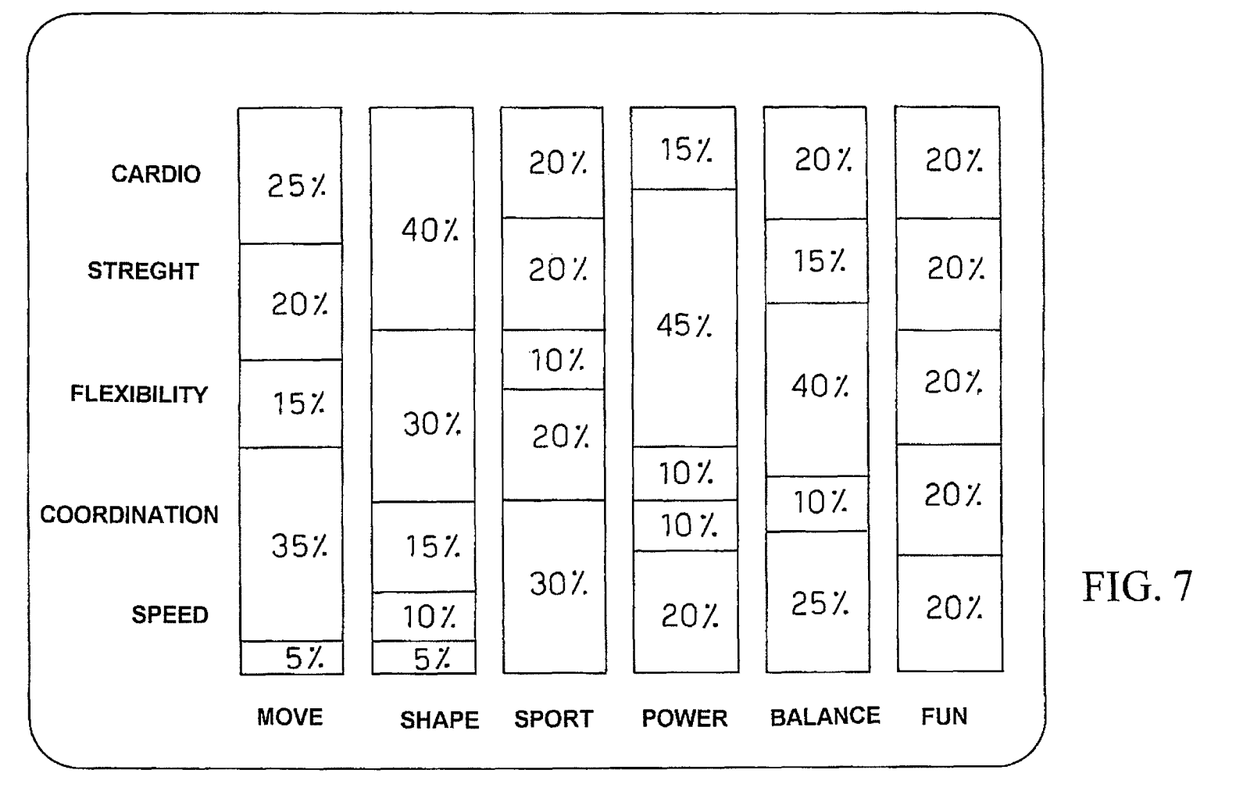
FIG. 7 shows a table representing an example of association of aspirations with the training components.

The ASPIRATIONS obtained by means of the statistical processes are put in relation, in the preferred embodiment, with the training components defined by the prior art so as to obtain a database, of which FIG. 7 shows an example, where different percentages of training components correspond to each base ASPIRATION, said training components having respective different priorities, as it will be described in detail below.

More particularly, the association of the aspirations with the training components is made, for instance, on heuristic basis, taking into account the bibliography of this specific field.

Analogously, in accordance with the present embodiment, the assignation of respective priorities to the training components for each aspiration is made on heuristic basis, taking into account the bibliography of this specific field.

Preferably, according to the present embodiment, after having assigned the training components to the different aspirations, priorities are assigned to each training component present at each aspiration.

For instance, the aspiration "MOVE", representing the desire of being active and healthy, has the "CARDIO" component as training component with highest priority, since such component is addressed to enhance the desire of maintaining the body active and wealthy.

The aspiration "POWER", for instance, which represents the desire of having the physical aspect of a powerful person, has the "STRENGTH" component as training component with highest priority, since such component is addressed to enhance the desire of improving musculature and strength.

Briefly, once the aspirations have been identified within a population, for each aspiration it is possible to identify training components and respective priorities of each training component.

Anyway, according to the present invention, the assignation of the training components to the ASPIRATIONS allows to associate families of tools or machines to each aspiration and consequently allows to solve the technical problem of assigning, for instance in case of gym areas computed on the basis of the aspirations, homogeneous tools and machines to respective areas, at it will be disclosed in detail below, thus giving shape to the gym according to aspiration or mean term objectives.

The database can generally comprise a plurality of Tables, each corresponding to a determined kind of population.

For instance, FIG. 7, as shown, has been built based on an experimental statistical analysis on the behaviours of users belonging to three European countries, namely Italy, Great Britain and The Netherlands and based on simplifications suggested by the experience.

The database, of which FIG. 7 is an example, is defined herein as a database of the guidelines for ASPIRATION-based programs (database of the ASPIRATION TRAINING GUIDELINES) and it is not a time-invariant database, but it undergoes variations depending on changes in population distribution (age, sex, etc.) or in the kind of population being analysed (religion, geographical location, etc.).

In the preferred embodiment it is however important having a tool determining a set of ASPIRATIONS, associating the training components with the ASPIRATIONS, mainly on a statistical basis, and building therefrom a reference database that can be used in the described method according to the present invention.

By summarising, base analysis modules 21a are inputted responses to a questionnaire accessible through terminals 14 and they output, as a result of the automatic statistical processes executed on server 12:

number of ASPIRATIONS detected in the user population being analysed, which number, in accordance with the exemplary embodiment, is lower than or equal to the six base ASPIRATIONS;

percentage distribution of each ASPIRATION within the user population;

a database of the guidelines for ASPIRATION-based programs (ASPIRATION Training Guidelines).

Base analysis modules 21a also supply, based on the responses to the questionnaire:

a database, referred to in the present description as "ASPIRATION Contact Management Library", which, as it will be specified in detail below, includes reference times and actions assigned to the trainers for managing the users by taking into account the different base ASPIRATIONS;

a database of colours preferred within each ASPIRATION (e.g. green for the balance ASPIRATION);

a database of possible groupings of non-conflicting base ASPIRATIONS within the gym system (for instance, move and shape or move and shape and fun ASPIRATIONS).

According to the present embodiment, all databases are preferably made on heuristic basis, taking into account the bibliography of this specific field.

Personal analysis modules 21b preferably are installed in server 12 and, in the preferred embodiment, they are configured for:

submitting the questionnaire, preferably with closed or limited responses, to the individual users connected by means of terminals 14 to server 12 through network 15; and providing the individual users, as it is described in detail below, with a map of the personal ASPIRATIONS averaged over the population corresponding to the population the user belongs to.

Figure 8:
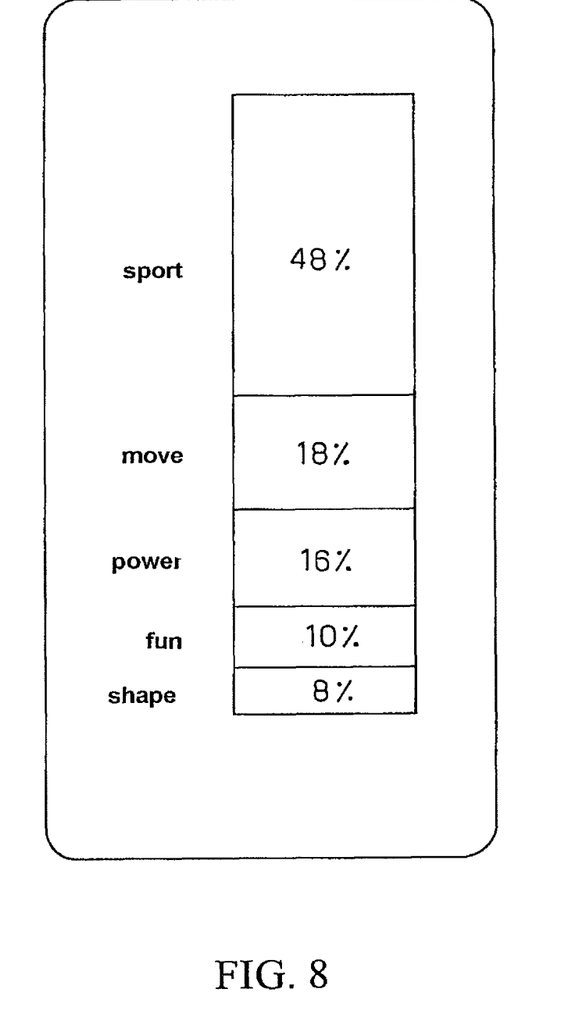
FIG. 8 shows a table with an example of map representing personal ASPIRATIONS of a gym facility user.

The map of the personal ASPIRATIONS (User ASPIRATION Map) can preferably be represented by means of a histogram, as shown in FIG. 8, and contains the percentage values of each ASPIRATION as obtained from the user's responses to the questionnaire.

In accordance with a still more preferred embodiment, personal analysis modules 21b are configured for analysing the ASPIRATIONS and the percentage values present in the User ASPIRATION Map, and for obtaining, by means of a software process (ASPIRATION training module 100, FIG. 3), preferably installed in the server 12, a histogram representing one or more training components customised for the user.

Figure 3:
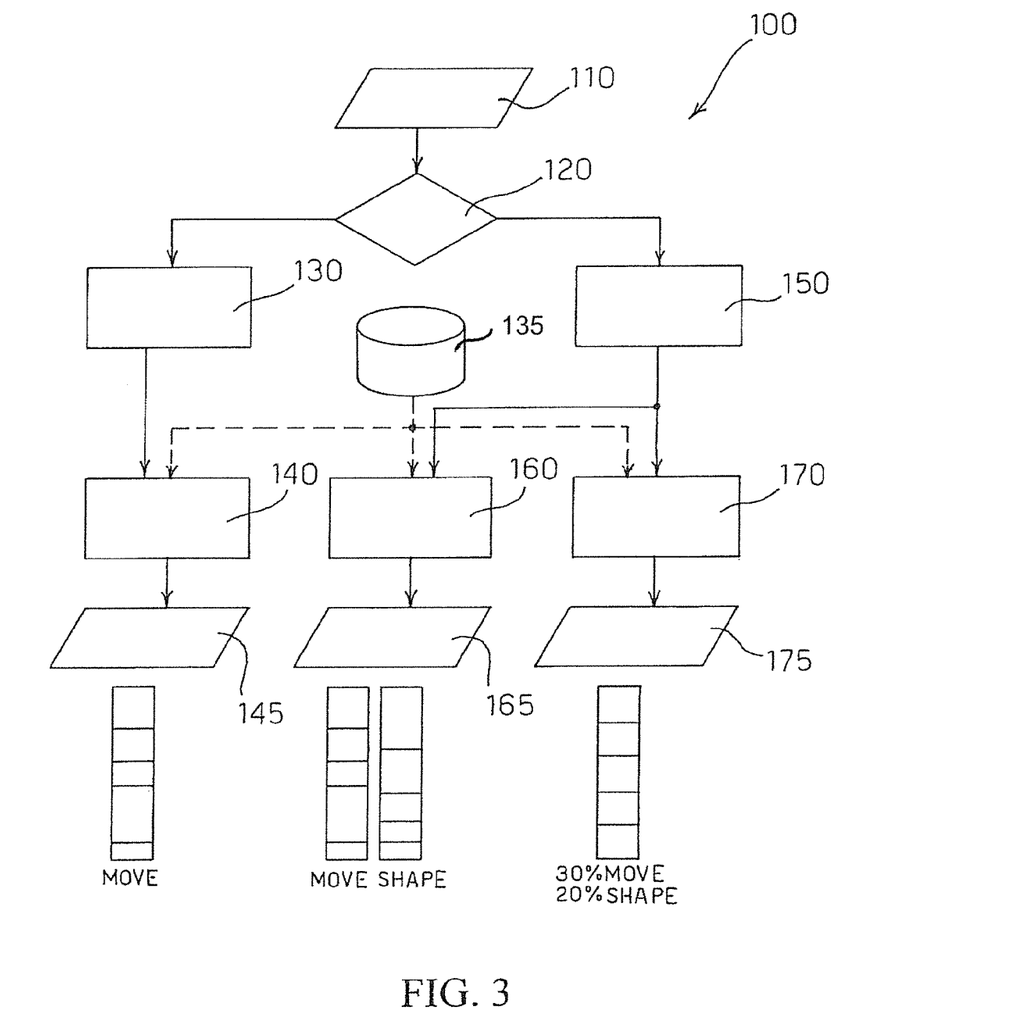
FIG. 3 shows a first example of a process implemented in the system shown in FIG. 1.

More particularly, in the preferred embodiment, ASPIRATION training process 100 operates as follows:
- starting from a User ASPIRATION Map 110 it checks, in a checking step 120, whether one of the base ASPIRATIONS exceeds a predetermined threshold, e.g. a threshold equal to 40%;
- in the affirmative, in a step 130 it associates the prevailing base ASPIRATION with the user; and
- in a step 140, based on the provisions of ASPIRATION Training Guidelines database 135, it computes the distribution of the training components and assigns the training components to the user; and
- in a further step 145, it makes available to the user, on remote terminal 14, the distribution of the training components corresponding to the user ASPIRATION that exceeds the predetermined threshold;
- if checking step 120 has a negative outcome, ASPIRATION training module 100 selects, in a step 150, the two ASPIRATIONS with the highest percentage values among the base ASPIRATIONS; and, alternatively, depending upon predetermined parameters:
- in a step 160, based on the provisions of ASPIRATION Training Guidelines database 135, it computes the distribution of the training components corresponding to the two highest or prevailing ASPIRATIONS (exceeding a predetermined threshold) and allots them to the user in two histograms; or
- in a step 170, based on the provisions of ASPIRATION Training Guidelines database 135, it computes the distribution of the training components corresponding to the highest ASPIRATIONS (exceeding a predetermined threshold), preferably two ASPIRATIONS, computes a weighted average thereof and assigns them to the user in a single histogram.

Like in the case of step 145, steps 160 and 170 are followed by respective steps 165 and 175 in which ASPIRATION training module 100 makes available to the user, on remote terminal 14, the distribution of the training components corresponding to the user's ASPIRATIONS, shown in one or more histograms.

ASPIRATION training process 100, as described, allows making locally available information exploiting a database of the "ASPIRATION Training Guidelines" generated on a statistical basis and on numerically significant populations.

Thus, the process as described exploits more general analysis elements, which can be controlled by a centralized server 12, in order to generate information that can be locally managed by the user for solving specific problems, for instance, of the gym.

Therefore, the described method makes centralized elaboration tools, which use information that otherwise would not be available, available for local elaboration tools or terminals 14.

The centralized tools guarantee to maintain general processes and information and to continuously update them in the course of time.

The local tools guarantee flexibility in adjusting general information to localized needs, for instance, in gyms 40.

Process modules 41 (FIG. 1 and FIG. 2) comprise both modules that preferably are residing in terminals 14, for instance located in gyms 40, and modules that preferably are residing in server 12.

More particularly, according to the preferred embodiment, the process modules include one or more of the following modules:
- software modules configured for assigning training programs to the individual users (User Program modules 41a);
- software modules configured for assigning to the trainers deadlines and activities useful for a proper management of the users according to the respective ASPIRATIONS (Contact Management modules 41b); and
- software modules configured for computing a subdivision of the gym in areas corresponding to the users' ASPIRATIONS and for identifying the kind and number of tools or machines to be assigned to each area (Gym Layout modules 41c).

A possible exemplary implementation of each of the process modules listed above will be provided hereinbelow.

User Program modules 41a, preferably residing on terminals 14 of gym 40, include a process 200 (FIG. 4) in which a training program is generated based on one or more histograms 210 assigned to each user; of course, the one or more histograms are representative of the distribution of the training components corresponding to the user's ASPIRATIONS.

Figure 4:
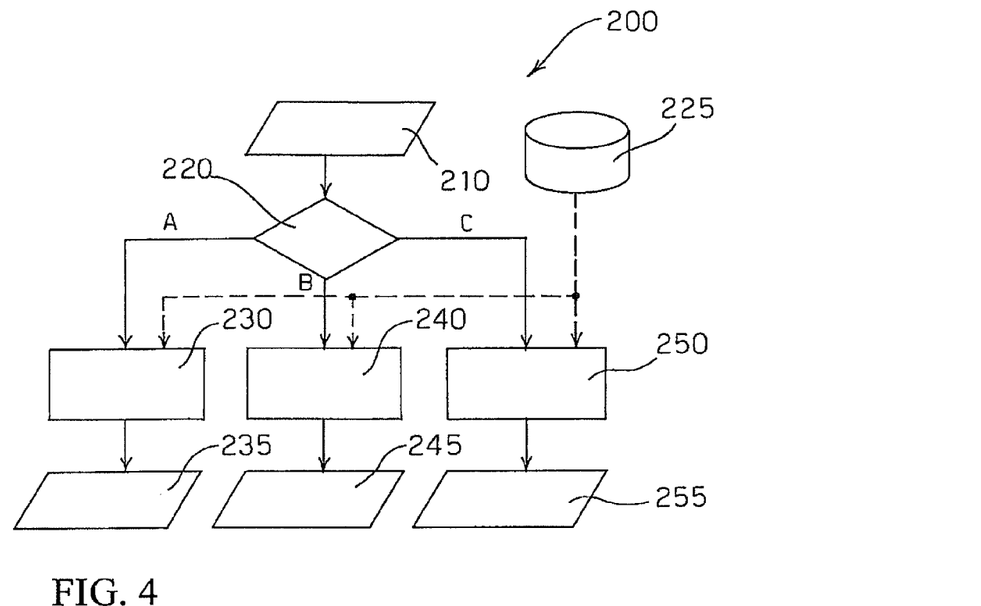
FIG. 4 shows a second example of a process implemented in the system shown in FIG. 1.

More particularly, process 200 includes the following steps:
- a checking step 220 in which the contents of the histogram(s) assigned to the user are checked;
- in case a single histogram, corresponding to a given base ASPIRATION, exists (path A), by exploiting a database 225 associated to the gym and preferably comprising one or more of the following information items:
  a) list of the tools available for each training component;
  b) list of the tools alternatively available for the same training components;
  c) gym areas where the available or alternatively available tools are located; the process calculates the training program in a step 230 and makes it available to the user as a printout or, preferably, as a printout and a stored magnetic support 235;
- in case two histograms, corresponding to two given base ASPIRATIONS, exist (path B), by exploiting database 225 associated to the gym the process calculates, in a step 240, the training program, which preferably comprises two alternating sessions of which the first session is intended to meet a first kind of ASPIRATION and the second session is intended to meet a second kind of ASPIRATION, and makes the program available to the user as a printout or, preferably, as a printout and a stored magnetic support 245;
- in case a single histogram, corresponding to a weighted average of two or more base ASPIRATIONS, exists (path C), by exploiting database 225 associated to the gym the process calculates, in a step 250, the training program comprising, within a single program, sessions calibrated on the basis of the weighted average and corresponding to a mixed program arranged to meet the two or more base ASPIRATIONS detected for the user, and makes the program available to the user as a printout or, preferably, as a printout and a stored magnetic support 255.

The disclosed method thus provides that elaboration processes residing in the server 12 provide information to local terminals 14 set for exploiting and elaborating said information and for obtaining training programs adjusted according to mean term needs of the users, i.e deeper and steadier needs (ASPIRATIONS).

Thank to this integrated process, the training programs result from a weighed combination of ASPIRATIONS and training components optimized for ASPIRATIONS.

Contact Management modules 41b, preferably residing on gym terminals 14, include a process 300 (FIG. 5) in which, starting from a map of the base ASPIRATIONS present in the gym, a given service in favour of the individual users is generated, for instance by the trainer.

Figure 5:
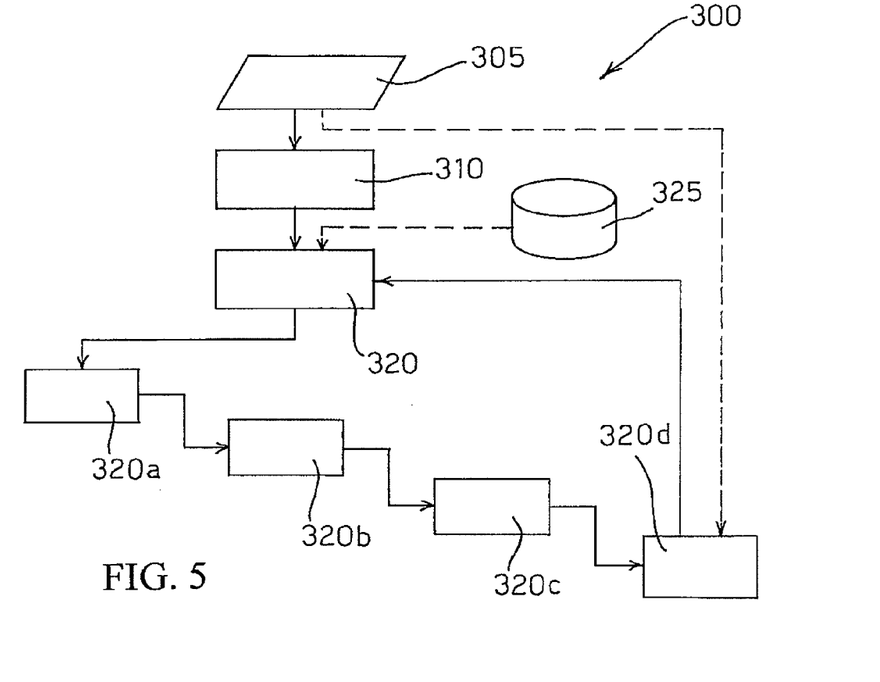
FIG. 5 shows a third example of a process implemented in the system shown in FIG. 1.

More particularly, according to the preferred embodiment, process 300 includes the following steps:
- a step 310 in which ASPIRATIONS 305 present in the gym are collected; preferably, in such a step 310, the prevailing base ASPIRATION is selected for each user of the gym and is associated with the user (such a step, in alternative embodiments, could also be executed on server 12);
- a computing step 320 in which, based upon the Contact Management Library 325 associated with each base ASPIRATION, a list of activities for the Trainer and of the related deadlines is associated with each gym user; for instance, such activities can be subdivided into a plurality of sequential steps, such as:
- generation of a starting list of activities 320a;
- generation of checking steps 320b on the average attendance of the user to the gym;
- generation of checking steps 320c on the user's training program;
- generation of modified training programs 320d, for instance programs updated based upon the data collected at the deadlines during checking steps 320b and 320c and possibly upon a new questionnaire submitted to the user by the personal analysis program 21b; such a step, as it can be clearly appreciated by a skilled in the art, can be cycled back from step 320.

Just as an example, the following Table 3 shows an exemplary list of checking steps to envisaged for the different kinds of base ASPIRATIONS as far as starting activity list 320a is concerned.

Thank to this integrated process, the training programs result from a weighed combination of ASPIRATIONS and training components optimized for ASPIRATIONS.

Figure 6:
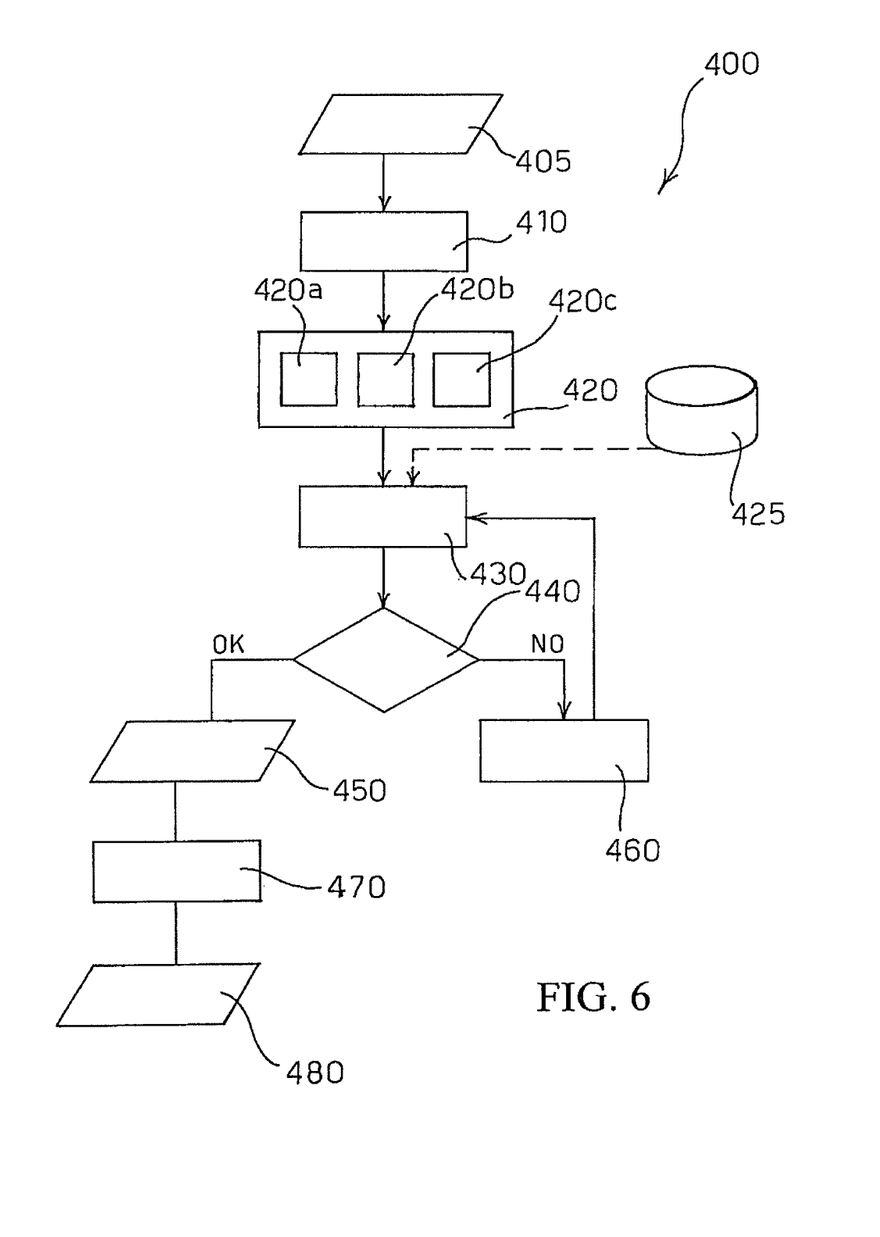
FIG. 6 shows a fourth example of a process implemented in the system shown in FIG. 1

More particularly, according to the preferred embodiment, process 400 includes the following steps:
- a step 410 in which the rank of the ASPIRATIONS is computed and the ASPIRATIONS present in the gym are normalised to percentage values;
- a selection step 420 in which a computing criterion is selected and employed for subdividing the gym into areas.

For instance, such step provides for considering information concerning the distribution of the aspirations present in the gym and taking such information as a reference for computing the size of the areas to be dedicated to each aspiration.

The computing criteria can provide for taking into account, besides the distribution of the aspirations, one or more of the following further values:
- probabilistic mean value 420a associated with the two prevailing ASPIRATIONS;
- mean value 420b of the percentage distribution of the ASPIRATIONS whose values exceed a predetermined threshold;
- number 420c of users whose attendance value, being the ASPIRATIONS the same, exceeds a computed mean value 420c or a predetermined value of visits in a predetermined period of time;
- an area computing step 430 in which, based on:
- selected criterion 420a, 420b 420c; and
- gym size 425;

the subdivision of the gym surface into areas related to the ASPIRATIONS is computed;
- a checking step 440 in which there is checked whether the surface of each area exceeds a predetermined threshold and:
- in the negative, the compatible ASPIRATIONS are grouped in a step 460 based on the database of the possible groupings of base ASPIRATIONS, and step 430 is resumed until all areas have surfaces exceeding the predetermined threshold,
- in the affirmative, the subdivision is provided in a step 450;

TABLE 3

| | BALANCE FIRST MEETING | MOVE FIRST MEETING | FUN FIRST MEETING | SHAPE FIRST MEETING | POWER FIRST MEETING | SPORT FIRST MEETING |
|---|---|---|---|---|---|---|
| STARTING LIST | FLEXIBILITY TESTS | FITNESS, FORCE AND FLEXIBILITY TESTS | PREVAILING ASPIRATION TESTS | FITNESS, FIGURE AND WEIGHT TESTS | RESISTANCE TESTS | RESISTANCE AND SPECIFIC SPORT TESTS |

Gym Layout modules 41c, preferably residing partially on server 12 and partially on terminals 14 of the gym, include one or more processes 400 (FIG. 6) in which, starting from a map 405 of the base ASPIRATIONS present in the gym, a subdivision of the gym surface into areas dimensioned according to the ASPIRATIONS as well as the kind and number of machines to be assigned to the different areas are computed.

Also in this case the disclosed method provides that elaboration processes residing in the server 12 provide information to local terminals 14 set for exploiting and elaborating said information and for obtaining training programs adjusted according to mean term needs of the users, i.e to deeper and steadier needs (ASPIRATIONS).

the kind and number of machines to be assigned to the different areas are computed in a step 470; and
the kind and number of machines to be assigned to the different areas are provided in a step 480.

The computation of the areas of the gym dedicated to each aspiration can be carried out, for instance, by means of program modules residing in the server 12, in the following way, taking as a reference the steps:
420: employing a computational criterion taking into account the characteristics of the gym users;
430: real computation of the gym areas dedicated to the different aspirations.

The modules for computing the gym areas dedicated to each ASPIRATION preferably reside in the server 12, since they essentially exploit information concerning ASPIRA- TIONS and, therefore, they are mainly affected by the more general criteria used for identifying them.

In step 420:

determining the percentage of visits in a week on the basis of the aspirations ($AVWA_i$) by means of expression:

$$AVWA_i = VWA_i / MA_i \quad (1)$$

wherein

AVWA is an index of the relative incidence of each aspiration i within the gym reported to the users having a determined aspiration and computed on a predetermined period of time (for instance a week);

VWA is the number of visits of users having a determined aspiration in the predetermined period of time;

MA is the overall number of gym users having a determined aspiration.

In step 430:

computing a normalized area for aspiration (NAAi):

$$NAA_i = (AVWA_i \times MPA_i) / \Sigma_{i=1-n} AVWA_i \times MPA_i \quad (2)$$

computing values of effective area of the gym to be dedicated to each aspiration:

$$ACA_i = NAA_i \times AC \quad (3)$$

wherein

NAA is the gym area dedicated to an aspiration normalized with respect to the sum of the areas per aspiration;

MPA is the percentage of gym users having a determined aspiration;

ACA is the value, for instance in square-meters, of the gym area;

i is the reference to a determined aspiration;

n is the number of the aspirations.

With reference, for instance to a gym having a usable surface of 3000 m² and a distribution of users or members per aspiration as reported in table 4, by applying the above-disclosed method and rounding off, for instance in a known way, the partial results, it is obtained that the gym surface can be subdivided on homogeneous areas, each dedicated to an aspiration, as pointed out in the last line of the Table 4 itself.

TABLE 4

| Aspiration | BALANCE | MOVE | FUN | SHAPE | POWER | SPORT |
|---|---|---|---|---|---|---|
| MPA | 15% | 29% | 15% | 18% | 11% | 12% |
| MA | 450 | 870 | 450 | 540 | 330 | 360 |
| VWA | 675 | 1001 | 810 | 756 | 1617 | 1044 |
| AVWA | 1.5 | 1.15 | 1.8 | 1.4 | 4.9 | 2.9 |
| NAA | 11% | 17% | 14% | 13% | 27% | 18% |
| ACA | 330 | 510 | 420 | 390 | 810 | 540 |

Before providing a detailed description of an embodiment considered as preferred embodiment for the step 470, some basic information being part of the general knowledge deriving from the bibliography relating to gym management are herein reported.

More particularly:

for each training component, one or more families of tools and machines are provided, each comprising one or more tools;

some of such one or more families of tools are common to different training components.

With respect to prior art, however, in the present invention it is provided that the families of tools and the tools within each family have different priorities depending on the kind of ASPIRATION.

Such assumption involves that the organization of the gym based on the ASPIRATIONS requires a finer computation that assigns the tools taking into account the different priorities associated to each tool.

In fact, taking the ASPIRATIONS (that as reported above represent the "deep desire of attaining something, of changing, of being different, which desire motivates to performing physical activity, motion, exercise and sport") as reference for the organization of the gyms, it is evident that some tools will be more suitable than the others for attaining the mean term ASPIRATIONS of the users.

In the following, it is reported an example of families of tools associated to the MOVE ASPIRATION, taking as a reference the priority training component "CARDIO".

The corresponding families of tools and tools are listed in the following Table 5.

TABLE 5

| MOVE ASPIRATION CARDIO | Family priority | Tool priority |
|---|---|---|
| Equipment family | | |
| Cycling | 1 | |
| Recline | | 1 |
| Bike | | 2 |
| Elliptical Step | 2 | |
| Syncro | | 1 |
| Vario | | 2 |
| Step | | 3 |
| Treadmill | 3 | |
| Jog | | 1 |
| Run | | 2 |
| Upper Body | 4 | |
| Top-Innovative seat | | 1 |
| Top-Standing position | | 2 |
| Lateral | 5 | |
| Total Body Wave | | 1 |
| Wave | | 2 |

It is evident that in other embodiments priorities could also be differently distributed, even if it is always valid the new approach that, contrary to prior art, provides for different priorities to different families of tools and to different tools belonging to the same family.

It is evident from the above that it is not trivial to arrange the gym tools within predetermined areas according to ASPIRATIONS and such arrangement must consider at least the priorities of the families of tools and the priorities of the tools inside each family.

In the following it is reported an example of computation process, still taking as a reference the MOVE ASPIRATION, but assuming, for simplifying the example, that according to the training components defined in the database the MOVE ASPIRATION includes the following training components: CARDIO, STRENGTH, FLEXIBILITY and COORDINATION, uniformly distributed with a 25% percentage and decreasing priority.

The computation provided in the step of macro-step 470 provides, for instance, for a recursive process in which, in general, the number of the tools having the highest priority belonging to the family having the highest priority is higher, by at least one unit, than the number of the tools belonging to families of tools having a lower priority within each training component.

More particularly, the computation, within each ASPIRATION, is carried out, for instance, as follows:

a first step in which the area assigned, in steps 420 and 430, to a determine ASPIRATION is subdivided in sub-areas corresponding in percentage to the training components of the ASPIRATION;

a second step in which it is extracted from a database containing for each tool having the highest priority within each family the gym area required for its exploitation;

a third step in which a mathematical process is carried out suitable for determining, on the basis of the required gym areas, a number of tools for each family wherein the number of tools belonging to the family having the highest priority is greater, by at least one unity, than the number of those having the immediately lower priority:

a fourth step in which it is verified whether the number of machines is compatible, for instance, with tools already present in the gym or with expected economic investments;

in case of incompatibility, the third step is repeated replacing the tools having the highest priority with other having the immediately lower priority and the process is iterated until the fourth step provides compatible results;

in case of compatibility, in a fifth step the obtained result is printed and/or made available to the gym trainer in graphic form.

A practical example is shown here below by referring again to the MOVE ASPIRATION applied to the CARDIO training component assuming that the area determined in steps 420 and 430 to be assigned to the MOVE ASPIRATION is 339 m², the area available for CARDIO component is 85 m² and the result of the fourth step of macro-step 430 is considered compatible with, for instance, the tools available in the gym.

TABLE 6

| CARDIO | Priority | Space on floor | N. of Units | Total space on floor |
|---|---|---|---|---|
| Cycling | 1 | | | |
| Recline | 1.1 | 1.25 | 12 | 14.976 |
| Bike | 1.2 | 0.92 | 0 | 0 |
| Elliptical Step | 2 | | | |
| Syncro | 2.1 | 1.86 | 11 | 20.4204 |
| Vario | 2.2 | 1.84 | 0 | 0 |
| Step | 2.3 | 1.14 | 0 | 0 |
| Tredmill | 3 | | | |
| Jog | 3.1 | 2.35 | 10 | 23.4507 |
| Run | 3.2 | 2.73 | 0 | 0 |
| Upper Body | 4 | | | |
| Top-Innovative seat | 4.1 | 1.31 | 9 | 11.78775 |
| Top-Standing position | 4.2 | 1.31 | 0 | 0 |
| Lateral | 5 | | | |
| Total Body Wave | 5.1 | 1.56 | 8 | 12.48 |
| Wave | 5.2 | 1.56 | 0 | 0 |
| TOTAL | | | | 83.11 |

Briefly, the method for managing users of a gym facility comprises:

more generic procedures applied to large populations in order to obtain statistically reliable information; such more generic procedures include for instance:
defining ASPIRATIONS;
assigning training components and corresponding priorities to the ASPIRATIONS;

more specific procedures applied to limited populations for instance gym populations, said procedures, by exploiting the statistically reliable information obtained by means of the more generic procedures, allowing for instance:
the correct distribution of areas of exploitation within the gym facility;
the correct arrangement of tools in the gym areas;
the provision of the correct environment (e.g. wall colours) for the tools in the areas of exploitation of the gym facility.

Of course, obvious changes and/or modifications of the above description in respect of the components, circuit elements and connections, as well as in respect of the details of the illustrated construction and the operating manner are possible without departing from the scope of the invention as defined in the following claims.

The invention claimed is:

1. A method of assigning a training program to a user of a gym facility, the method comprising:
receiving and analyzing, at a computing device, a response from the user to a questionnaire;
associating at least one aspiration with the user based on the analysis of the response from the user to the questionnaire;
based on the at least one aspiration associated with the user, allocating non-zero training percentages to each training component comprising a cardio component, a strength component, a flexibility component, a coordination component, and a speed component; and
determining, at the computing device, the training program for the user based on the allocated non-zero training percentages for each of the training components and a list of tools available for each of the training components,
wherein the at least one aspiration is selected from:
a move aspiration, representing the desire of being active and healthy;
a shape aspiration, representing the desire of appearing fit;
a power aspiration, representing the desire of having the physical aspect of a powerful person;
a sport aspiration, representing the desire of actively practicing sports;
a balance aspiration, representing the desire of relaxing from a stressful life; and
a fun aspiration, representing the desire of meeting new people and being confronted with new experiences.

2. The method of claim 1, wherein:
the allocating non-zero training percentages to training components comprises allocating the non-zero training percentages based on at least two histograms representative of training percentages for each of the training components associated with two aspirations; and
the determining the training program for the user comprises determining at least two alternating training sessions each corresponding to one of the two aspirations.

3. The method of claim 1, further comprising assigning the management of users of the gym facility to a trainer, and
computing a list of activities and related deadlines for each user based on a database of actions envisaged for a determined number of aspirations.

4. The method of claim 3, wherein the computing the list of activities and related deadlines comprises one or more of the following:
generating a starting list of activities;
generating checking steps and deadlines on the average user's attendance at the gym; and
generating checking steps and deadlines on the user's training program.

5. A non-transitory computer readable medium storing a program causing a computer to execute a process for assigning a training program to a user of a gym facility, the process comprising:
receiving and analyzing, at a computing device, a response from the user to a questionnaire;

associating at least one aspiration with the user based on the analysis of the response from the user to the questionnaire;

based on the at least one aspiration associated with the user, allocating non-zero training percentages to each training component comprising a cardio component, a strength component, a flexibility component, a coordination component, and a speed component; and determining, at the computing device, the training program for the user based on the allocated non-zero training percentages for each of the training components and a list of tools available for each of the training components, wherein the at least one aspiration is selected from:
  a move aspiration, representing the desire of being active and healthy;
  a shape aspiration, representing the desire of appearing fit;
  a power aspiration, representing the desire of having the physical aspect of a powerful person;
  a sport aspiration, representing the desire of actively practicing sports;
  a balance aspiration, representing the desire of relaxing from a stressful life; and
  a fun aspiration, representing the desire of meeting new people and being confronted with new experiences.

6. The non-transitory computer readable medium of claim 5, wherein the allocating non-zero training percentages to training components comprises allocating the non-zero training percentages based on at least two histograms representative of training percentages for each of the training components associated with two aspirations; and the determining the training program for the user comprises determining at least two alternating training sessions each corresponding to one of the two aspirations.

* * * * *